United States Patent [19]
Feketitsch

[11] Patent Number: 5,796,040
[45] Date of Patent: *Aug. 18, 1998

[54] ANGLED CABLE UNION

[75] Inventor: Herbert Feketitsch, Schechingen, Germany

[73] Assignee: Jacob GmbH Elektrotechnische Fabrik, Wurtt, Germany

[*] Notice: This patent issued on a continued prosecution application filed under 37 CFR 1.53(d), and is subject to the twenty year patent term provisions of 35 U.S.C. 154(a)(2).

[21] Appl. No.: 722,061

[22] PCT Filed: Apr. 14, 1995

[86] PCT No.: PCT/EP95/01409

§ 371 Date: Oct. 11, 1996

§ 102(e) Date: Oct. 11, 1996

[87] PCT Pub. No.: WO95/28759

PCT Pub. Date: Oct. 26, 1995

[30] Foreign Application Priority Data

Apr. 16, 1994 [DE] Germany .................. 94 06 382.6

[51] Int. Cl.⁶ ........................................ H02G 3/06
[52] U.S. Cl. ........................................ 174/65 SS
[58] Field of Search .................. 174/65 SS, 65 G, 174/65 R, 135; 285/179, 921, 319; 403/207

[56] References Cited

U.S. PATENT DOCUMENTS

| | | | |
|---|---|---|---|
| 2,366,444 | 1/1945 | Dorman | 285/179 |
| 4,946,202 | 8/1990 | Perricone | 285/166 |
| 5,276,280 | 1/1994 | Ball | 174/65 R |

FOREIGN PATENT DOCUMENTS

| | | | |
|---|---|---|---|
| 3614198 | 10/1987 | Germany | H02G 15/106 |
| 9204256 | 7/1992 | Germany | H02G 3/06 |
| 2253458 | 9/1992 | United Kingdom | F16L 5/00 |

*Primary Examiner*—Kristine L. Kincaid
*Assistant Examiner*—Joseph Waks
*Attorney, Agent, or Firm*—Renner, Otto, Boisselle & Sklar, P.L.L.

[57] ABSTRACT

In order to bending stress on an inserted cable in an angular cable gland with two enclosure sections, the bore axes of which intersect, occuring due to a conventional right-angle of intersection, it is suggested to connect the two end section (10 and 14) of the enclosure by an intermediate section (12) of the same in such way that each intermediate section is adjacent to two end sections in an obtuse angle.

10 Claims, 5 Drawing Sheets

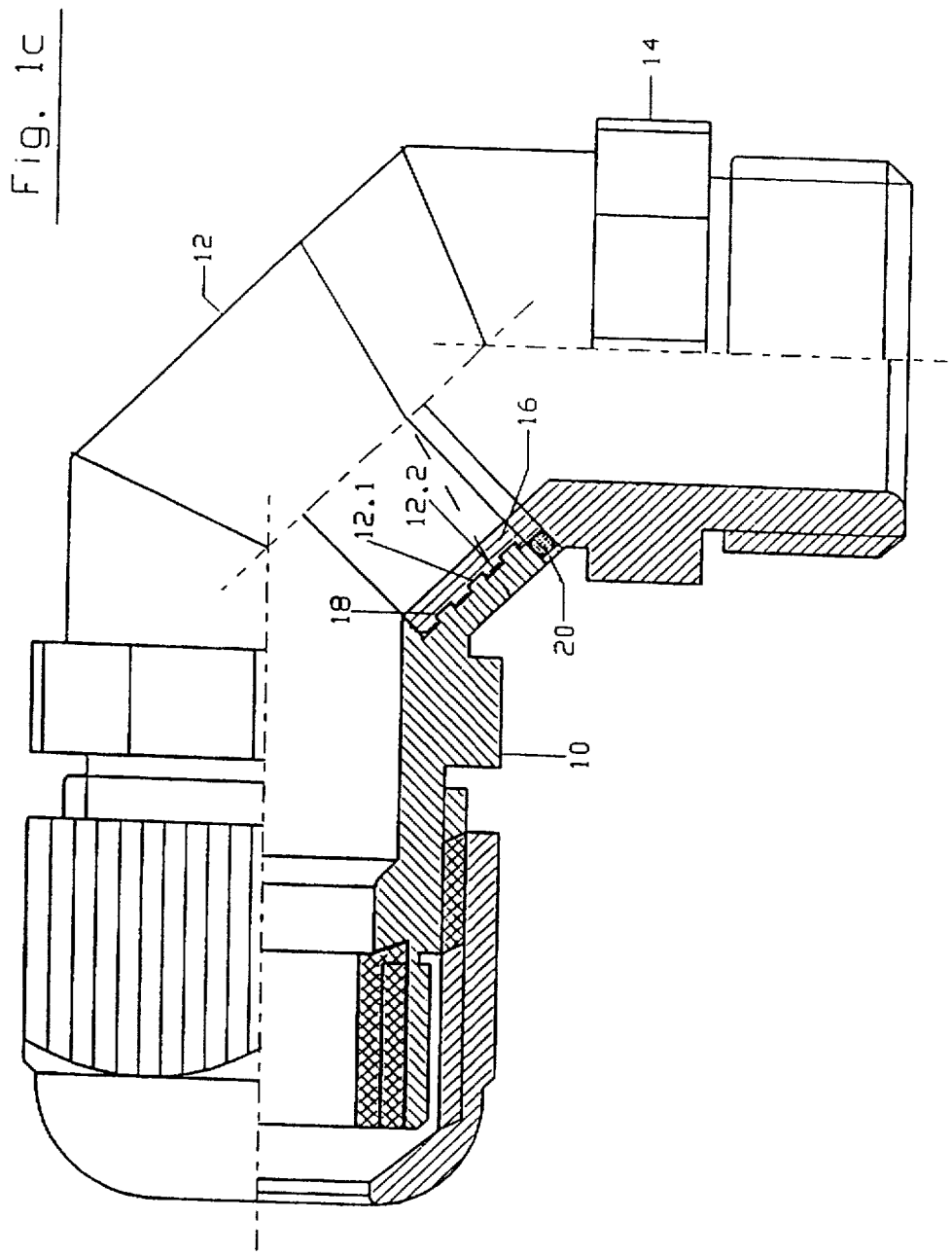

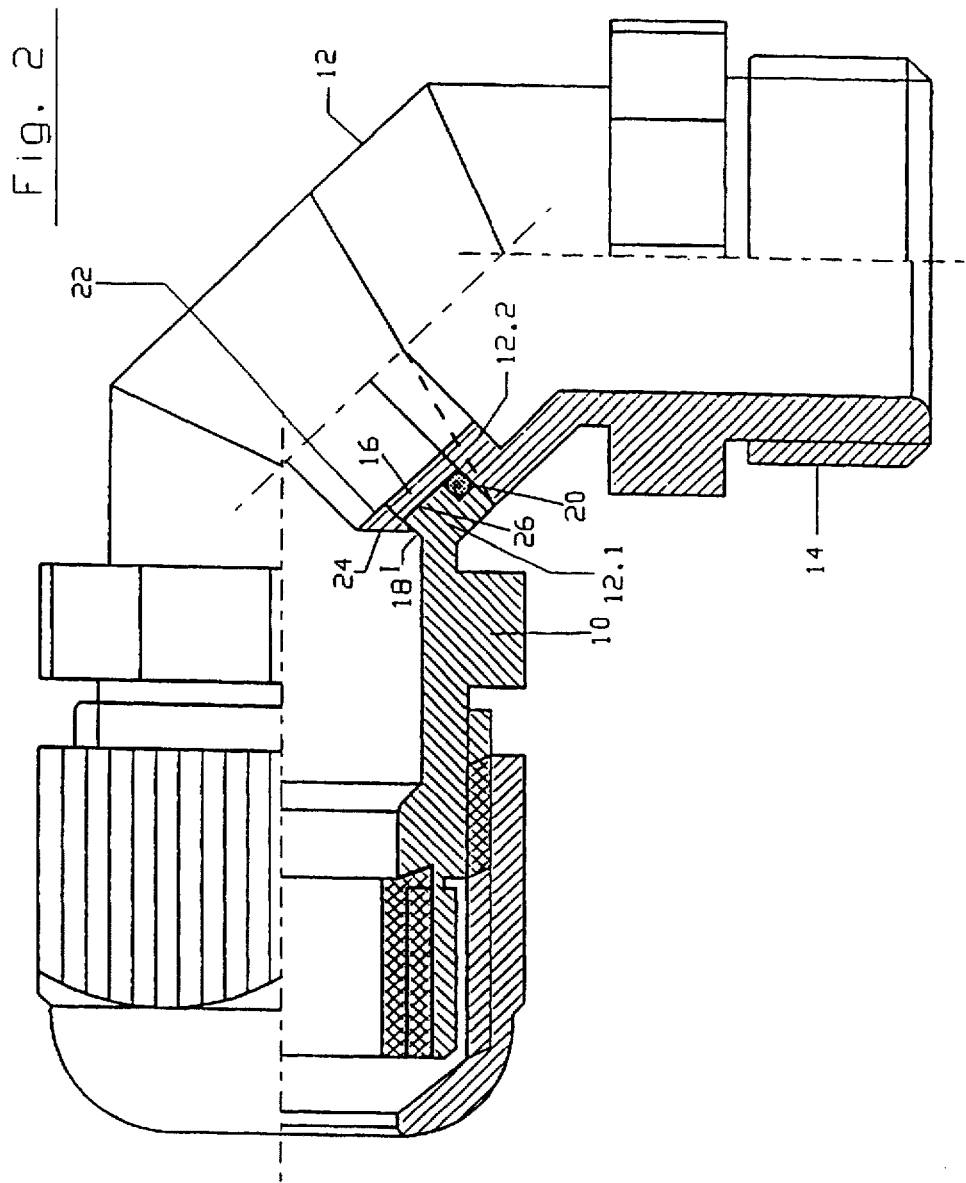

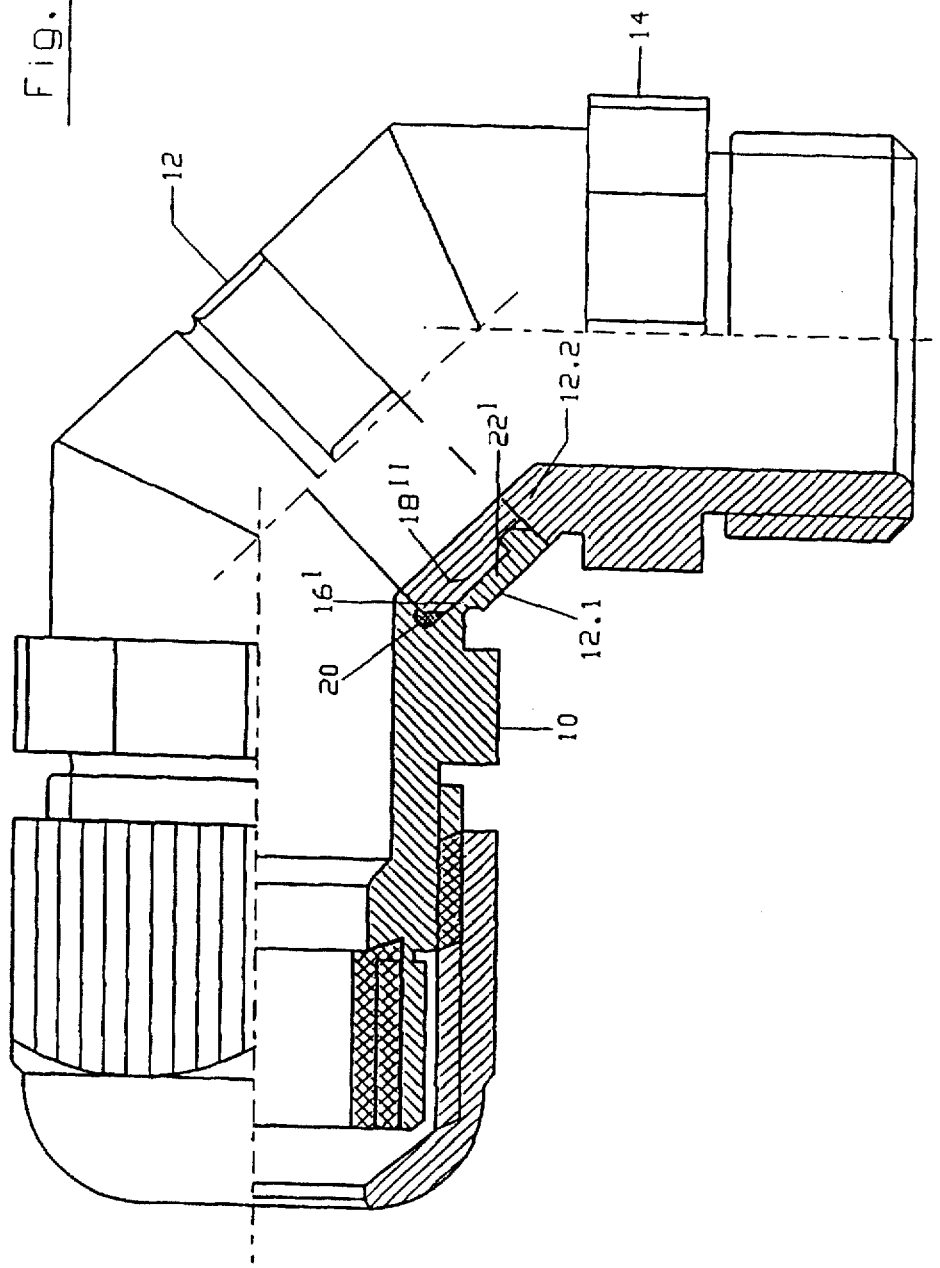

ANGLED CABLE UNION

BACKGROUND OF THE INVENTION

The invention relates to an angled cable union with and without strain release, for electrical equipment.

The state of the art is based on 90° cable unions consisting of only two enclosure sections, either connected rigidly or hinged to each other. For unions with hinged enclosure sections, an outwardly square-shaped enclosure is diagonally divided into the two triangular sections forming a hinge at the external corner of the enclosure, allowing the enclosure to be opened by 90°, with the two bores of the two sections thereby being aligned to form a straight cable union. This is followed by the enclosure being folded back for closing, with the cable being bent in a right angle as in rigid 90° cable unions.

A disadvantage of both rigid and hinged cable unions is the high bending stress on the cable in the union. In addition, rigid cable unions require tedious pulling of the cable over an angle of 90° and hinged cable unions are expensive to manufacture.

SUMMARY OF THE INVENTION

It is the aim of the invention to reduce stress on the cable and to facilitate pulling the cable through, without unduly increasing manufacturing costs.

The solution of this aim is an angled cable union for electrical equipment comprising an enclosure including at least two end sections having one continuous bore each, the axes of which intersect after assembly, wherein the end sections are connected with each other for entry and exit respectively of the cable by at least one intermediate section therebetween, the at least one intermediate section forming an obtuse angle to each of the adjacent end sections.

The advantage of this solution is reduced bending of the cable with an extended 90° cable curvature through two easily-separable enclosure halves. When the two halves of the enclosure are joined, the cable deflection of 90° is effected in two individual steps by means of at least one intermediate section, preferably a central section, of the enclosure.

In a preferred embodiment of the angled cable union according to the invention, the device has been designed to allow the halves of the enclosure to be rotated relative to one another after a cable has been pulled through both halves and the halves have been connected together.

Other useful embodiments of the angled cable union according to the invention include an engaging mechanism at the rotary connection of the two enclosure halves and a snap coupling of the two halves.

Angled cable unions having two enclosure sections are known from DE-A 36 14 198 and GB-A-2 253 458, having only end sections for entry and exit of the cable. These unions lack an intermediate section of the enclosure, in particular one central section of the same, with the effect that the cable after pulling in is bent in at least two points, with the main bend being more than 90°. In these two prior art unions, the two mitred end sections abut in such a way that they allow preliminary collinear arrangement for passing the cable through, followed by being arranged in a right angle to each other.

The following is a detailed description of the invention based on several embodiments presented as examples in the drawings of the angled cable union according to the invention.

BRIEF DESCRIPTION OF THE DRAWINGS

FIG. 1c is a part sectional, part elevational view of a variation of the first embodiment utilizing sawtooth shaped tabs.

FIG. 2 is a part sectional, part elevational view of an alternative to the first embodiment.

FIG. 3 is a part sectional, part elevational view of a second embodiment.

DETAILED DESCRIPTION

Figure 1A:
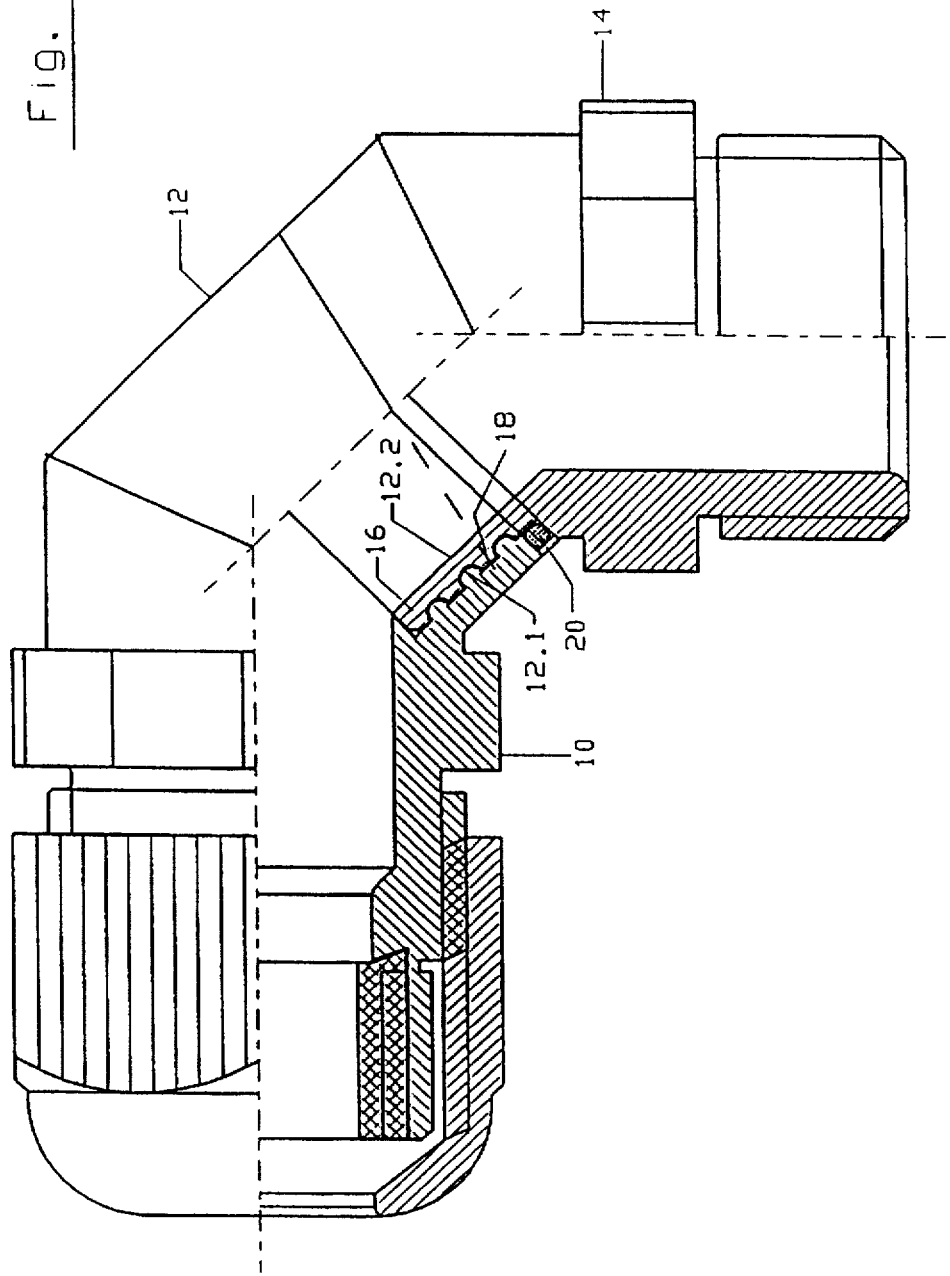
FIG. 1a is a part sectional, part elevational view of the first embodiment of the invention.

Where the described angled cable unions agree, the same reference numbers are used for identical or corresponding parts.

The embodiments described are more or less copied from the utility model DE-U-92 04 256 (Jacob) as to the left-hand or top half. Each embodiment includes one enclosure having a left end section 10, a single central intermediate section 12, and a bottom end section 14. Each section has a straight bore, the axes of which intersect each other in pairs in an obtuse angle of less than 120°, resulting in an overall rectangular, slightly curved deflection of the cable (not shown).

The central intermediate section 12 consists of two parts: one radial external part 12.1, which is integrally connected with the left end section 10, and a coaxial, radial internal part 12.2, which is integrally connected with the bottom end section 14, therefore forming two halves of the enclosure (one half consisting of the left section 10 and the external part 12.1, and the other half consisting of the bottom section 14 and the internal part 12.2). The two halves are assembled in the direction of the axis of the intermediate section bore, and can be separated again.

A combined rotary and snap coupling of the two parts 12.1 and 12.2, connecting the two enclosure halves to form intermediate section 12, is accomplished by cooperation of several axially parallel, resilient tabs 16 of the part 12.2 distributed symmetrically about the bore of the intermediate section 12, and an annular area 18 of the other part 12.1, as described hereafter.

An engaging mechanism (not shown) is provided at the rotary coupling to stop the enclosure section in a specific rotary position in order to make the solid angle formed by the two halves level. In addition, a radially enclosed, axially clamped O-ring 20 is provided for sealing the joint in the enclosure at the separation point of the intermediate section 12.

All variations and alternatives of the first embodiment have the common feature that the parallel tabs 16 are projecting radially internally along the intermediate section 12.

Figure 1B:
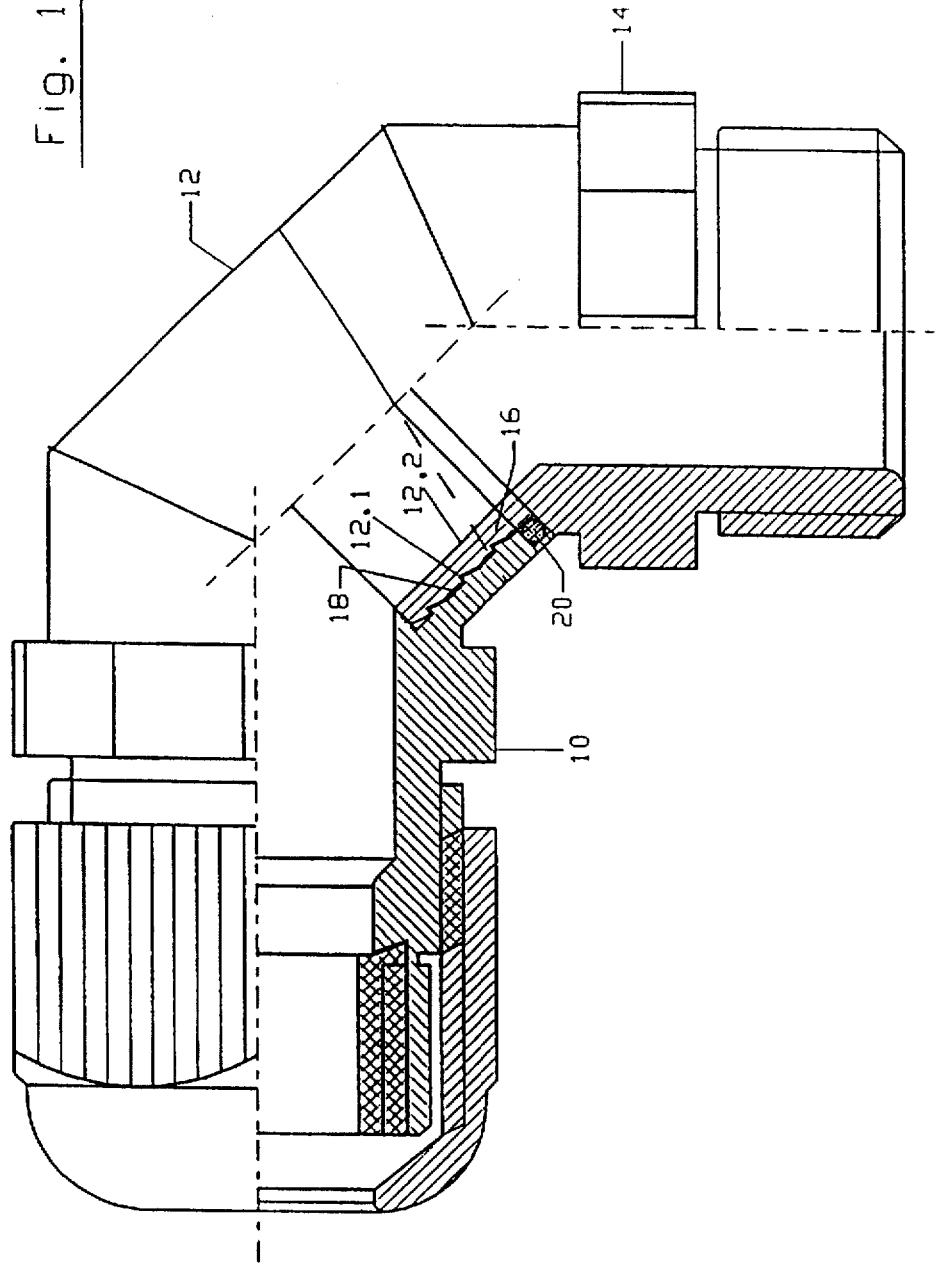
FIG. 1b is a part sectional, part elevational view of a variation of the first embodiment utilizing rectangularly-shaped tabs.

In FIG. 1, the internal axial annular area 18 of the part 12.1 has a profile characterized by flat base sections separating projections, the projections corresponding to respective cross-sectional recesses in the tabs 16. In FIG. 1a the cross-section of the projections is semicircular (forming raised rings); in FIG. 1b the cross-section is sawtooth shaped; and in FIG. 1c the cross-section is rectangular.

An axial stop, when assembling the two enclosure halves together, results from abutting of the free ends of the tabs 16 on the one enclosure half and the mount of the O-ring 20 on the other half. In the alternative, four hooks 22 are moulded on the free ends of the tabs according to FIG. 2, forming a continuous tapered sheath area 24. The tabs engage behind an annular area 18' provided on radial external part 12.1. The four tabs 16 of the example are radially internal and are relieved in a circular cylindrical surface 26 of the radial external part 12.1 of the intermediate section 12.

The second embodiment (FIG. 3) corresponds to the hooking principle of the alternative of the first (see FIG. 2) and is mainly differentiated by the fact that the four tabs 16' provided with hooks 22' are in this case on the part 12.1. Thus the tabs 16 are radially external, and the annular surface 18" is designed as a recessed external shoulder on the part 12.2. The O-ring 20 has also changed its position and is now provided on the base of the tabs 16.

I claim:

1. An angled cable union for electrical equipment comprising an enclosure including two end sections each having one continuous bore with an axis, the axes intersecting after assembly, wherein the end sections are connected with each other for entry and exit respectively of a cable by at least one intermediate section therebetween, wherein each said at least one intermediate section has a continuous bore with an axis intersecting at an obtuse angle to each of the axes of the continuous bores of said end sections.

2. A cable union according to claim 1, wherein one of the at least one intermediate section is a united section comprising two parts which are detachably connected with each other.

3. A cable union according to claim 2, wherein a rotary coupling of the two parts of said united section is provided, the rotary coupling having a rotary axis and the rotary axis coinciding with the axis of the bore of the united section.

4. A cable union according to claim 2, wherein a quick-connect locking mechanism is provided between the two parts of the united section.

5. A cable union according to claim 4 including a seal enclosing the bore of the united section, wherein the seal is adjacent to the locking mechanism.

6. A cable union according to claim 3, wherein the rotary coupling is provided with an engaging mechanism locking the coupling when the axes of the bores of the two end sections and of the united section are in the same plane.

7. A cable union according to claim 4, wherein the locking mechanism comprises one part of the two parts of the united section including radial internal disposed profiled tabs distributed over the periphery of the bore of the united section, and an annular surface with complimentary profile on the other part of the two parts of the united section.

8. A cable union according to claim 7, wherein the complimentary profiles of the tabs and the annular surface are moulded periodically along the axis of the united section, so that there is a form-fitting of the tabs to the annular surface to which the tabs are force-locked.

9. A cable union according to claim 8, wherein the profile of the annular surface is formed by identical, axially successive projections, the projections having a shape which is semicircular, rectangular, or sawtooth shaped.

10. A cable union according to claim 7, wherein the tabs are provided with radial external hooks and the annular surface is designed as a shoulder for engaging the hooks.

\* \* \* \* \*